United States Patent
Kwon et al.

(10) Patent No.: US 8,288,494 B2
(45) Date of Patent: Oct. 16, 2012

(54) TRANSPARENT THERMOPLASTIC RESIN COMPOSITION WITH IMPROVED IMPACT STRENGTH AND MELT FLOW INDEX

(75) Inventors: Kee Hae Kwon, Uiwang-si (KR); Jin Hwa Chung, Uiwang-si (KR); Kwang Soo Park, Uiwang-si (KR); Dong Kil Choi, Uiwang-si (KR); Il Jin Kim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/973,975

(22) Filed: Dec. 21, 2010

(65) Prior Publication Data

US 2011/0160383 A1    Jun. 30, 2011

(30) Foreign Application Priority Data

Dec. 31, 2009   (KR) .................. 10-2009-0135032
Oct. 1, 2010   (KR) .................. 10-2010-0095918

(51) Int. Cl.
C08F 20/06 (2006.01)
C08F 20/10 (2006.01)
C08F 20/44 (2006.01)
C08F 20/68 (2006.01)
C08F 120/06 (2006.01)
C08L 33/02 (2006.01)
C08L 33/04 (2006.01)

(52) U.S. Cl. ............. 526/317.1; 526/318; 526/318.1; 526/318.44; 525/221; 525/222

(58) Field of Classification Search ............. 526/317.1, 526/318, 318.1, 318.44; 525/221, 222
See application file for complete search history.

(56) References Cited

U.S. PATENT DOCUMENTS 4,287,315 A    9/1981    Meyer et al.
5,633,329 A *   5/1997    Hahnle et al. ............. 526/64
6,906,142 B2 *   6/2005    Schultes et al. ............ 525/209

FOREIGN PATENT DOCUMENTS

KR    2004-0079118 A    9/2004

* cited by examiner

Primary Examiner — Nathan M Nutter
(74) Attorney, Agent, or Firm — Summa, Additon & Ashe, P.A.

(57) ABSTRACT

The present invention provides a transparent thermoplastic resin composition which may comprise (A) about 1 to about 100 parts by weight of an ultra-high molecular weight branched acrylic copolymer resin; (B) about 0 to about 99 parts by weight of an acrylic resin; and (C) about 0 to about 40 parts by weight of an acrylic impact modifier, based on 100 parts by weight of (A) and (B). The ultra-high molecular branched acrylic copolymer resin (A) may be prepared by polymerizing a monomer mixture comprising (a1) about 50 to about 99.899% by weight of a mono-functional monomer, (a2) about 0.1 to about 40% by weight of a (meth)acrylic monomer having a flexible segment represented following Chemical Formula 1, and (a3) about 0.001 to about 10% by weight of a branch-inducing monomer. The thermoplastic resin composition of the present invention can have improved transparency, scratch resistance, flowability, and impact strength.

[Chemical Formula 1]

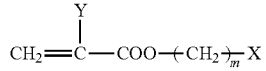

wherein m is an integer from 3 to 18, Y is methyl or hydrogen, and X is methyl or hydrocarbon.

18 Claims, 1 Drawing Sheet

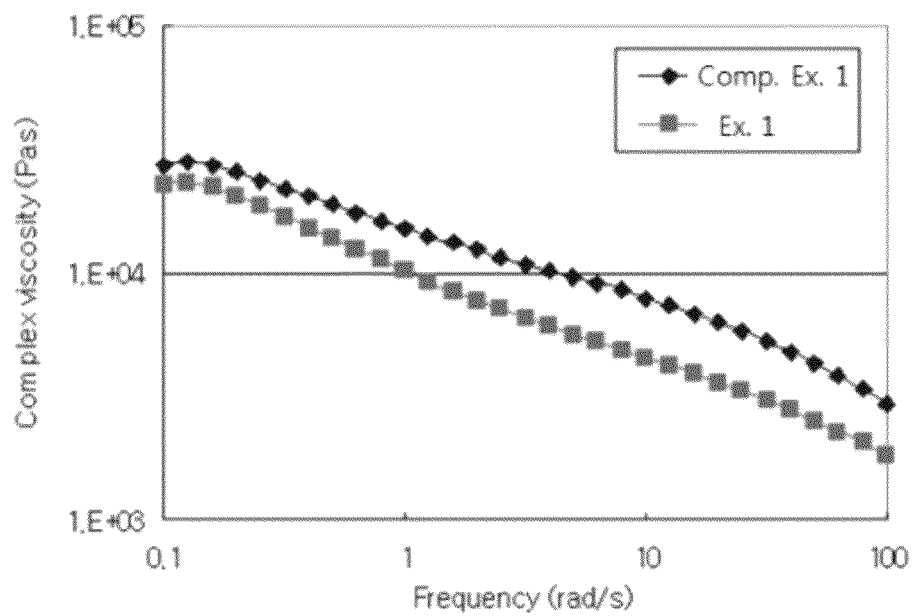

TRANSPARENT THERMOPLASTIC RESIN COMPOSITION WITH IMPROVED IMPACT STRENGTH AND MELT FLOW INDEX

CROSS-REFERENCE TO RELATED APPLICATIONS

This application claims priority from Korea Patent Application Nos. 10-2009-0135032 and 10-2010-0095918, which were filed on Dec. 31, 2009 and Oct. 1, 2010, respectively, in the Korean Intellectual Property Office, the disclosure of which is incorporated herein by reference in its entirety.

FIELD OF THE INVENTION

The present invention relates to a transparent thermoplastic resin composition that can have improved impact strength and scratch resistance.

BACKGROUND OF THE INVENTION

Thermoplastic resins can have an excellent balance of physical properties and excellent moldability, and can be a substitute for glass or metal due to their low specific gravity. Accordingly, thermoplastic resins are widely used for various products such as automobile parts, electrical/electronic appliances, and the like.

Polycarbonate resin is an engineering plastic having excellent mechanical strength, heat resistance, transparency, weather resistance, flame resistance and the like. Accordingly, polycarbonate resin is used widely for electrical/electronic appliances, automobile parts, building materials and the like. Polycarbonate resin can also be a substitute for glass in applications demanding both transparency and impact resistance such as lens. However, polycarbonate resin has poor scratch resistance.

In contrast, polymethylmethacrylate (PMMA) resin has good transparency, weatherability, mechanical strength, surface gloss, adhesive strength, and excellent scratch resistance. It can be difficult, however, to impart impact resistance and flame retardancy to a PMMA resin.

An acrylic resin such as polymethylmethacrylate can be alloyed with polycarbonate resin to provide a thermoplastic resin composition with good scratch resistance. However, it can be difficult to obtain high transparency and colorability due to the difference between the refractive indices of the polycarbonate resin and the acrylic resin.

Korean Patent Publication Laid-open No. 2004-0079118 discloses a method of lowering the molecular weight of polycarbonate during a kneading process using metal stearic acid ester in order to improve the compatibility between a polycarbonate resin and a methacrylate resin. However, the blend of the polycarbonate and the methacrylate resin has significantly reduced mechanical properties.

U.S. Pat. No. 4,287,315 discloses a methacrylate resin with good impact strength by adding an ethylene-vinyl acetate rubber to a blend of polycarbonate and methacrylate resin. The resin blend, however, has low transparency.

SUMMARY OF THE INVENTION

Accordingly, the present inventors have developed a thermoplastic resin composition that can have improved impact strength and scratch resistance as well as high transparency and high flowability. The thermoplastic resin composition of the invention includes an ultra-high molecular weight branched acrylic copolymer resin having a flexible segment. Even though the ultra-high molecular weight branched acrylic copolymer resin has a high molecular weight, the inventors have found that it is possible to improve flowability due to the branched structure thereof. Further, the inventors have found that the flexible segment can provide improved impact strength to the composition. Accordingly, the transparent thermoplastic resin composition of the present invention can exhibit a variety of desirable properties.

The transparent thermoplastic resin composition of the invention may comprise (A) about 1 to about 100 parts by weight of an ultra-high molecular weight branched acrylic copolymer resin; (B) about 0 to about 99 parts by weight of an acrylic resin; and (C) about 0 to about 40 parts by weight of an acrylic impact modifier, based on 100 parts by weight of (A) and (B). The ultra-high molecular branched acrylic copolymer resin (A) may be prepared by polymerizing a monomer mixture comprising (a1) about 50 to about 99.899% by weight of a mono-functional monomer, (a2) about 0.1 to about 40% by weight of a (meth)acrylic monomer having a flexible segment represented by the following Chemical Formula 1, and (a3) about 0.001 to about 10% by weight of a branch-inducing monomer, based on the total weight of the ultra-high molecular branched acrylic copolymer resin (A).

[Chemical Formula 1]

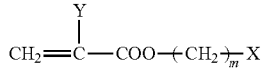

wherein m is an integer from 3 to 18, Y is methyl or hydrogen, and X is methyl or hydrocarbon.

In exemplary embodiments, the ultra-high molecular branched acrylic copolymer resin (A) may have a refractive index from about 1.480 to about 1.495, and may have a weight average molecular weight of about 100,000 to about 5,000,000.

In exemplary embodiments, the ultra-high molecular branched acrylic copolymer resin (A) may be prepared by bulk polymerization, emulsion polymerization, or suspension polymerization.

In exemplary embodiments, the (meth)acrylic monomer (a2) having a flexible segment may be butyl (meth)acrylate, t-butyl (meth)acrylate, hexyl (meth)acrylate, 2-ethyl hexyl (meth)acrylate, stearyl (meth)acrylate, lauryl (meth)acrylate, or a combination thereof.

In exemplary embodiments, the acrylic resin (B) may have a weight average molecular weight of about 5,000 to about 300,000, In exemplary embodiments, a test specimen prepared from the transparent thermoplastic resin composition of the present invention having dimensions of L 90 mm×W 50 mm×T 2.5 mm can have a haze value of less than about 10, as measured by a Haze meter NDH 2000 manufactured by Nippon Denshoku.

According to a further aspect of the present invention, there is provided a molded article produced from the aforementioned resin composition.

BRIEF DESCRIPTION OF THE DRAWING

FIG. 1 is a graph comparing viscosity behavior of a specimen prepared using a composition of the present invention with viscosity behavior of a specimen prepared using a conventional acrylic resin.

DETAILED DESCRIPTION OF THE INVENTION

The present invention will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

In an exemplary embodiment, a transparent thermoplastic resin composition of the present invention may comprise (A) about 1 to about 100 parts by weight of an ultra-high molecular weight branched acrylic copolymer resin; and (B) about 0 to about 99 parts by weight of an acrylic resin.

In some embodiments, the transparent thermoplastic resin composition can include the ultra-high molecular weight branched acrylic copolymer resin (A) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 parts by weight. Further, according to some embodiments of the present invention, the amount of the ultra-high molecular weight branched acrylic copolymer resin (A) can be in a range from about any of the foregoing amounts to about any other of the foregoing amounts.

In some embodiments, the transparent thermoplastic resin composition may not include the acrylic resin (B) (i.e., the transparent thermoplastic resin composition may include 0% by weight of the acrylic resin (B)). In some embodiments, the acrylic resin (B) may be present in the transparent thermoplastic resin composition, i.e., the transparent thermoplastic resin composition may include the acrylic resin (B) in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 parts by weight. Further, according to some embodiments of the present invention, the amount of the acrylic resin (B) can be in a range from about any of the foregoing amounts to about any other of the foregoing amounts.

In an exemplary embodiment, the ultra-high molecular branched acrylic copolymer resin (A) may be prepared by polymerizing a monomer mixture comprising (a1) about 50 to about 99.899% by weight of a mono-functional monomer, (a2) about 0.1 to about 40% by weight of a (meth)acrylic monomer having a flexible segment represented by the following Chemical Formula 1, and (a3) about 0.001 to about 10% by weight of a branch-inducing monomer.

[Chemical Formula 1]

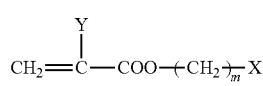

wherein m is an integer from 3 to 18, Y is methyl or hydrogen, and X is methyl or hydrocarbon.

As used herein, unless otherwise defined, the term "hydrocarbon" includes substituted or unsubstituted C1-C30 alkyl, substituted or unsubstituted C5-C30 cycloalkyl, or substituted or unsubstituted C5-C30 aryl. Also as used herein, unless otherwise defined, the term "substituted" refers to a group in which a hydrogen substituent is substituted with a halogen (F, Cl, Br, I), a hydroxy group, a nitro group, cyano group, an amino group, a carboxyl group, a C1 to C20 alkyl group, a C2 to C20 alkenyl group, a C2 to C20 alkynyl group, a C1 to C20 alkoxy group, a C6 to C30 aryl group, a C6 to C30 aryloxy group, a C3 to C30 cycloalkyl group, a C3 to C30 cycloalkenyl group, a C3 to C30 cycloalkynyl group, or a combination thereof.

In some embodiments, the ultra-high molecular branched acrylic copolymer resin (A) can include the mono-functional monomer (a1) in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, 99.8, or 99.899% by weight. Further, according to some embodiments of the present invention, the amount of the mono-functional monomer (a1) can be in a range from about any of the foregoing amounts to about any other of the foregoing amounts.

In some embodiments, the ultra-high molecular branched acrylic copolymer resin (A) can include the (meth)acrylic monomer having a flexible segment (a2) in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the amount of the (meth)acrylic monomer having a flexible segment (a2) can be in a range from about any of the foregoing amounts to about any other of the foregoing amounts.

In some embodiments, the ultra-high molecular branched acrylic copolymer resin (A) can include the branch-inducing monomer (a3) in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10% by weight. Further, according to some embodiments of the present invention, the amount of the branch-inducing monomer (a3) can be in a range from about any of the foregoing amounts to about any other of the foregoing amounts.

In exemplary embodiments, the transparent thermoplastic resin composition may comprise (A) about 1 to about 100 parts by weight of an ultra-high molecular weight branched acrylic copolymer resin; (B) about 0 to about 99 parts by weight of an acrylic resin; and (C) about 0 to about 40 parts by weight of an acrylic impact modifier based on 100 parts by weight of (A) and (B).

In some embodiments, the transparent thermoplastic resin composition may not include the acrylic impact modifier (C) (i.e., the transparent thermoplastic resin composition may include 0% by weight of the acrylic impact modifier (C)). In some embodiments, the acrylic impact modifier (C) may be present in the transparent thermoplastic resin composition, i.e., the transparent thermoplastic resin composition may include the acrylic impact modifier (C) in an amount of greater than and/or about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight. Further, according to some embodiments of the present invention, the amount of the acrylic impact modifier (C) can be in a range from about any of the foregoing amounts to about any other of the foregoing amounts.

The transparent thermoplastic resin composition of the present invention can have improved scratch resistance and high transparency as well as high impact strength by adding (A) an ultra-high molecular weight branched acrylic copolymer resin having a flexible segment. Furthermore, although the transparent thermoplastic resin composition of the present invention includes a resin (A) with a high molecular weight, it is possible to improve the flowability because of the branched structure of (A). Accordingly, the transparent thermoplastic resin composition of the present invention can also exhibit excellent moldability.

(A) Ultra-High Molecular Weight Branched Acrylic Copolymer Resin

In an exemplary embodiment, the ultra-high molecular branched acrylic copolymer resin (A) of the present invention may be prepared by polymerizing a monomer mixture comprising (a1) about 50 to about 99.899% by weight of a mono-functional monomer, (a2) about 0.1 to about 40% by weight of a (meth)acrylic monomer having a flexible segment, and (a3) about 0.001 to about 10% by weight of a branch-inducing monomer, based on the total weight of the ultra-high molecular branched acrylic copolymer resin (A).

In an exemplary embodiment, the ultra-high molecular branched acrylic copolymer resin (A) can be prepared by copolymerizing a mixture of methyl methacrylate and methyl acrylate with butyl-acrylate and 1,6-hexanediol di(meth)acrylate.

In another exemplary embodiment, the ultra-high molecular branched acrylic copolymer resin (A) can be prepared by copolymerizing a mixture of methyl methacrylate and methyl acrylate with butyl-methacrylate and divinyl tetramethyl disiloxane.

In another exemplary embodiment, the ultra-high molecular branched acrylic copolymer resin (A) may be used alone or in combination with the acrylic resin (B). When the ultra-high molecular branched acrylic copolymer resin (A) is combined with the acrylic resin (B), the combination of (A) and (B) can include the ultra-high molecular branched acrylic copolymer resin (A) in an amount of about 1 parts by weight to about 100 parts by weight, for example about 5 to about 80 parts by weight, and as another example about 10 to about 70 parts by weight.

When the ultra-high molecular branched acrylic copolymer resin (A) is used in an amount of less than about 1 parts by weight, good impact strength properties may not be obtained.

The ultra-high molecular branched acrylic copolymer resin (A) of the present invention may have a refractive index from about 1.480 to about 1.495, and may have a weight average molecular weight of about 100,000 to about 5,000,000.

The ultra-high molecular branched acrylic copolymer resin (A) may be prepared by conventional methods such as bulk polymerization, emulsion polymerization, and suspension polymerization.

When preparing the ultra-high molecular branched acrylic copolymer resin (A), it is possible to increase the degree of polymerization, or the branch-inducing monomer (a3) may be included in order to control the molecular weight.

Examples of the mono-functional acrylic monomer (a1) may include, but are not limited to, methyl methacrylate, ethyl methacrylate, propyl methacrylate, methyl acrylate, ethyl acrylate, propyl acrylate, 2-ethyl hexyl acrylate, 2-hydroxyethyl acrylate, 2-hydroxypropyl acrylate, monoglycerol acrylate, acrylic acid, methacrylic acid, maleic anhydride, and the like, and mixtures thereof.

According to the present invention, the (meth)acrylic monomer (a2) having a flexible segment may be represented by the following Chemical Formula 1.

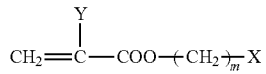

[Chemical Formula 1]

$$CH_2=\overset{Y}{\underset{|}{C}}-COO-(CH_2)_{\overline{m}}X$$

wherein m is an integer from 3 to 18, Y is methyl or hydrogen, and X is methyl or hydrocarbon, as defined herein.

In an exemplary embodiment, the ultra-high molecular weight branched acrylic copolymer resin (A) may include the (meth)acrylic monomer (a2) having the flexible segment in an amount of about 0.1 or more but less than about 40% by weight, for example about 0.5 or more but less than about 30%, and as another example about 1 or more but less than about 20%, based on the total weight of the ultra-high molecular weight branched acrylic copolymer resin (A).

If the amount of the (meth)acrylic monomer (a2) having the flexible segment is less than about 0.1% by weight, it may be difficult to obtain good impact strength properties which can be provided by the flexible segment. If the amount of (meth)acrylic monomer (a2) having the flexible segment is more than about 40% by weight, the properties of the acrylic resin may be deteriorated.

When the (meth)acrylic monomer (a2) having the flexible segment is used, it is possible to increase the molecular weight of the ultra-high molecular weight branched acrylic copolymer resin (A), and the structure of resin can be softened due to the flexible segment. Therefore, the impact strength of the resin can be significantly improved.

In an exemplary embodiment, the (meth)acrylic monomer (a2) having the flexible segment as represented following Chemical Formula 1 may include a relatively short chain when m is an integer from 3 to 9, or may include a relatively long chain when m is an integer from 10 to 18.

Further, the (meth)acrylic monomer (a2) having the flexible segment may comprise a combination of a (meth)acrylic monomer (a2) having a short chain wherein m is an integer from 3 to 9 and a (meth)acrylic monomer (a2) having a long chain wherein m is an integer from 10 to 18.

Examples of the (meth)acrylic monomer (a2) having a flexible segment may include without limitation butyl (meth)acrylate, t-butyl (meth)acrylate, hexyl (meth)acrylate, 2-ethyl hexyl (meth)acrylate, stearyl (meth)acrylate, lauryl (meth)acrylate, and the like, and combinations thereof.

In exemplary embodiments, the branch-inducing monomer (a3) may include two or more radically polymerizable unsaturated groups. These monomers may be used alone or in combination with one another. The number of the functional groups of the branch-inducing monomer may be from 2 to 8. A branched copolymer having ultra-high molecular weight may be prepared by using the branch-inducing monomers having such functional groups.

Examples of the branch-inducing monomer (a3) may include without limitation silane or siloxane compounds having two or more radically polymerizable unsaturated groups, (meth)acrylic monomers, aromatic monomers, vinyl group-containing monomers, allyl compounds, and the like, and combinations thereof.

Specific examples of the branch-inducing monomer may include, without limitation, silane or siloxane compounds including unsaturated hydrocarbon group-containing silicone-containing monomers such as divinyl tetramethyl disiloxane and tetramethyl tetravinyl cyclotetrasiloxane; allyl compounds including diallyl phthalate, diallylacrylamide, triallyl (iso)cyanurate, and triallyl trimelitate; (meth)acrylic monomers including (poly)alkylene glycol di(meth)acrylate compounds such as 1,6-hexanediol di(meth)acrylate, (poly) ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate, and glycerol tri(meth)acrylate; aromatic monomers including divinylbenzene; and vinyl group-containing monomers including 1,4-divinyloxybutane and divinylsulfone. They may be used alone or in combination with one another.

In exemplary embodiments, the ultra-high molecular weight branched acrylic copolymer resin (A) may include the branch-inducing monomer (a3) in an amount of about 0.001 or more but less than about 10% by weight, for example about 0.01 or more but less than about 7% by weight, and as another example about 0.1 or more but less than about 5% by weight, based on the total weight of the ultra-high molecular branched acrylic copolymer resin (A).

If the amount of the branch-inducing monomer (a3) is less than about 0.001% by weight, it can be difficult to form the branched structure. If the amount of the branch-inducing monomer (a3) is more than about 10% by weight, the moldability of the ultra-high molecular weight branched acrylic copolymer resin (A) may deteriorate due to increased viscosity.

(B) Acrylic Resin

The transparent thermoplastic resin composition of the present invention may further optionally include an acrylic resin (B). The acrylic resin (B) may a polymer of a single type of (meth)acrylic monomer, a copolymer of one or more kinds of (meth)acrylic monomer(s), or a combination thereof.

In exemplary embodiments, the acrylic resin (B) may have a linear structure, a weight average molecular weight of about 5,000 to about 300,000, and a refractive index of about 1.480 to about 1.495.

Examples of the (meth)acrylic monomer may include without limitation methyl methacrylate, ethyl methacrylate, n-propyl methacylate, n-butyl methacylate, phenyl methacrylate, benzyl methacrylate, hexyl methacrylate, cyclohexyl methacrylate, phenoxy methacrylate, phenoxyethyl methacrylate, methyl acrylate, ethyl acrylate, propyl acrylate, butyl acrylate, 2-ethyl-hexyl acrylate, 2-ethyl-hexyl-methacrylate and the like. The (meth)acrylic monomer may be used singly or as a combination thereof.

The acrylic resin (B) can be prepared by known methods such as emulsion polymerization, suspension polymerization, or bulk polymerization, and the preparation thereof can be readily carried out by a person of ordinary skill in the art.

(C) Acrylic Impact Modifier

The transparent thermoplastic resin composition of the present invention may further optionally include an acrylic impact modifier (C).

In an exemplary embodiment, the acrylic impact modifier (C) may prepared by graft polymerization of one or more rubber monomers comprising an acrylic rubber monomer, such as but not limited to a (meth)acrylic acid C1-C10 alkyl ester based rubber, such as butyl acrylate rubber; and one or more monomers comprising methyl methacrylate, styrene, α-methyl styrene, C1-C4 alkyl-substituted styrene, acrylonitrile, methacrylonitrile, maleic acid anhydride, C1-C4 alkyl N-substituted maleimide, phenyl N-substituted maleimide, or a combination thereof. The acrylic impact modifier (C) may include the rubber in an amount of about 20 to about 80 parts by weight, based on 100 parts by weight of the acrylic impact modifier (C)

In exemplary embodiments, the acrylic impact modifier (C) may be a powder product having a multi-layer structure which comprises butyl acrylate as a rubber component, such as IR-441 (produced by MRC Corporation), M-210 (produced by KANEKA Corporation), and the like.

In the present invention, the acrylic impact modifier can be used optionally, depending on the requirements of the thermoplastic resin of the invention. In exemplary embodiments, the thermoplastic resin composition of the invention can include the acrylic impact modifier (C) in an amount of about 0 or more but less than about 40 parts by weight based on 100 parts by weight of a base resin including (A) and (B).

If the ultra-high molecular branched acrylic copolymer resin (A) is used alone or in combination with the acrylic resin (B), it is possible to obtain improved impact strength while maintaining transparency and scratch resistance of an acrylic resin due to the flexible segment and molecular weight of the ultra-high molecular weight branched acrylic copolymer resin (A). Furthermore, although the transparent thermoplastic resin composition of the present invention includes a resin (A) with a high molecular weight, it is possible to improve the flowability because viscosity of the resin (A) is lowered due to its branched structure.

The thermoplastic resin composition may further comprise one or more additives which can be selected according to the desired properties of the composition. Exemplary additives may include without limitation antimicrobials, release agents, thermal stabilizers, antioxidants, light stabilizers, compatibilizers, pigments, inorganic fillers, surfactants, nucleating agents, coupling agents, fillers, plasticizers, impact modifiers, coloring agents, stabilizers, lubricants, antistatic agents, dyes, flameproof agents, and the like. These additives may be used alone or in combination with one another. The thermoplastic resin composition of the invention may include the additive(s) in conventional amounts.

The thermoplastic resin composition of the present invention may be prepared by conventional methods. For example, the aforementioned components and optional additives may be mixed in a mixer together and the mixture may be melt-extruded through a conventional extruder in pellet form. Then the resin pellets may be used to prepare plastic molded articles by conventional molding techniques, such as but not limited to injection and extrusion molding. Alternatively, the composition can be directly extruded into the desired product again using conventional molding techniques.

Since the thermoplastic resin composition can have excellent scratch resistance, impact strength, transparency, and/or moldability, the thermoplastic resin composition may be molded into various articles such as housings of electrical and electronic goods, parts of automobiles, lenses, window glasses, and the like.

In some exemplary embodiments, the transparent thermoplastic resin composition may be used in housings of electrical and electronic products such as TVs, audio sets, washing machines, cassette players, MP3 players, telephones, game devices, video players, computers, photocopiers, and the like.

In an exemplary embodiment, the transparent thermoplastic resin composition may be used for internal or external parts of automobiles such as dashboard panels, instrumental panels, door panels, quarter panels, wheel covers, and the like.

The molding methods may be, but are not limited to, extrusion, injection, or casting molding, and may be easily carried out by those skilled in the art.

The invention may be better understood by reference to the following examples which are intended for the purpose of illustration and are not to be construed as in any way limiting the scope of the present invention, which is defined in the claims appended hereto.

EXAMPLES

(A) Ultra-High Molecular Weight Branched Acrylic Copolymer Resin (A-1) Ultra-High Molecular Weight Branched Acrylic Copolymer Resin-1

An ultra-high molecular weight branched acrylic copolymer resin is prepared by conventional suspension polymerization of 87.4% by weight of methyl methacrylate monomer, 2.5% by weight of methyl acrylate, 10% by weight of butyl acrylate, and 0.1% by weight of 1,6-hexanediol diacrylate. The resulting copolymer has a refractive index of 1.49 and a weight average molecular weight of 200,000 g/mol.

(A-2) Ultra-High Molecular Weight Branched Acrylic Copolymer Resin-2

An ultra-high molecular weight branched acrylic copolymer resin is prepared by conventional suspension polymerization of 92.4% by weight of methyl methacrylate monomer, 2.5% by weight of methyl acrylate, 5% by weight of butyl acrylate, and 0.1% by weight of 1,6-hexanediol diacrylate. The resulting copolymer has a refractive index of 1.49 and a weight average molecular weight of 200,000 g/mol.

(A-3) Ultra-High Molecular Weight Branched Acrylic Copolymer Resin-3

An ultra-high molecular weight branched acrylic copolymer resin is prepared by conventional suspension polymerization of 87.25% by weight of methyl methacrylate monomer, 2.5% by weight of methyl acrylate, 10% by weight of butyl acrylate, and 0.25% by weight of 1,6-hexanediol diacrylate. The resulting copolymer has a refractive index of 1.49 and a weight average molecular weight of 200,000 g/mol.

(A-4) Ultra-High Molecular Weight Branched Acrylic Copolymer Resin-4

An ultra-high molecular weight branched acrylic copolymer resin is prepared by conventional suspension polymerization of 87% by weight of methyl methacrylate monomer, 2.5% by weight of methyl acrylate, 10% by weight of butyl acrylate, and 0.5% by weight of 1,6-hexanediol diacrylate. The resulting copolymer has a refractive index of 1.49 and a weight average molecular weight of 200,000 g/mol.

(A-5) Ultra-High Molecular Weight Branched Acrylic Copolymer Resin-5

An ultra-high molecular weight branched acrylic copolymer resin is prepared by conventional suspension polymerization of 87% by weight of methyl methacrylate monomer, 2.5% by weight of methyl acrylate, 10% by weight of butyl acrylate, and 0.5% by weight of divinyl tetramethyl disiloxane. The resulting copolymer has a refractive index of 1.49 and a weight average molecular weight of 200,000 g/mol.

(A-6) Ultra-High Molecular Weight Branched Acrylic Copolymer Resin-6

An ultra-high molecular weight branched acrylic copolymer resin is prepared by conventional suspension polymerization of 87.4% by weight of methyl methacrylate monomer, 2.5% by weight of methyl acrylate, 10% by weight of butyl methacrylate, and 0.1% by weight of 1,6-hexanediol diacrylate. The resulting copolymer has a refractive index of 1.49 and a weight average molecular weight of 200,000 g/mol.

(A-7) Ultra-High Molecular Weight Branched Acrylic Copolymer Resin-7

An ultra-high molecular weight branched acrylic copolymer resin is prepared by conventional suspension polymerization of 87.4% by weight of methyl methacrylate monomer, 2.5% by weight of methyl acrylate, 10% by weight of stearyl methacrylate, and 0.1% by weight of 1,6-hexanediol diacrylate. The resulting copolymer has a refractive index of 1.49 and a weight average molecular weight of 200,000 g/mol.

(A-8) Ultra-High Molecular Weight Branched Acrylic Copolymer Resin without a Flexible Segment-8

An ultra-high molecular weight branched acrylic copolymer resin is prepared by conventional suspension polymerization of 97.4% by weight of methyl methacrylate monomer, 2.5% by weight of methyl acrylate, and 0.1% by weight of 1,6-hexanediol diacrylate. The resulting copolymer has a refractive index of 1.49 and a weight average molecular weight of 200,000 g/mol.

(A-9) Acrylic Copolymer Having a Flexible Segment-9

An acrylic copolymer resin is prepared by conventional suspension polymerization of 87.4% by weight of methyl methacrylate monomer, 2.5% by weight of methyl acrylate, and 10% by weight of butyl acrylate. The resulting copolymer has a refractive index of 1.49 and a weight average molecular weight of 200,000 g/mol.

(B) Acrylic Resin (B-1) Acrylic Resin-1

An acrylic resin is prepared by conventional suspension polymerization of 97.5% by weight of methyl methacrylate monomer, and 2.5% by weight of methyl acrylate. The resulting copolymer is a linear copolymer with a refractive index of 1.49 and a weight average molecular weight of 100,000 g/mol.

(B-2) Acrylic Resin-2

An acrylic resin is prepared by conventional suspension polymerization of 97.5% by weight of methyl methacrylate monomer, and 2.5% by weight of methyl acrylate. The resulting copolymer is a linear copolymer with a refractive index of 1.49 and a weight average molecular weight of 200,000 g/mol.

(C) Acrylic Impact Modifier

A multi-layered acrylic impact modifier commercially available as M-210 (produced by KANEKA Corporation) is used, which is produced by graft polymerization of a butyl acrylate rubber, acrylic monomer, and styrene monomer.

Examples 1 to 8 and Comparative Examples 1 to 5

The components as shown in Table 1 and additives such as thermal stabilizers are added to a conventional mixer, and the mixture is extruded through a conventional twin screw extruder (L/D=29, F=45 mm) to prepare a product in pellet form. The pellets are dried at 80° C. for 6 hours and then molded into test specimens in a 6 oz injection molding machine.

The transparency of each specimen is estimated by measuring Haze and transmittance of the specimen. A test specimen with dimensions of L 90 mm×W 50 mm×T 2.5 mm is used for measuring the above appearance properties.

The total light transmittance is measured by a Haze meter NDH 2000 manufactured by Nippon Denshoku, and calculated by adding diffuse light transmittance (DF) and parallel transmittance (PT). It can be estimated that the higher total light transmittance is, the better transparency is.

The Izod impact strength (¼" notched and unnotched, kgf·cm/cm) is measured in accordance with ASTM 256A. The results are shown in Tables 1.

The falling impact strength (thickness of specimen: 3.0 t) is measured in accordance with JIS K6718. The results are shown in Tables 1.

The flowability (Melt Flow Index, g/10 min) is measured in accordance with ASTM D-1238. The results are shown in Tables 1.

The scratch resistance is measured by a ball-type scratch profile (BSP) test. The BSP is conducted by applying a scratch of a length of 10~20 mm onto resin specimens with dimensions of L 90 mm×W 50 mm×T 2.5 mm at a load of 1,000 g and a scratch speed of 75 mm/min, using a metal spherical tip with a diameter of 0.7 mm and measuring a profile of the applied scratch through a surface profile analyzer (XP-1) manufactured by Ambios Corporation which provides a scratch profile through surface scanning using a metal stylus tip with a diameter of 2 μm. The scratch resistance is evaluated from the scratch width by the measured profile.

The viscosity behaviors of the resin compositions of Example 1 and Comparative Example 1 are measured by ARES (Advanced Rheometric Expansion System) manufactured by Rheometric Scientific Corporation at 240° C., and are shown in FIG. 1.

tendency to decrease, as the frequency (rad/s) increases from 0.1 to 100, and Example 1 exhibits a more significant decrease than Comparative Example 1.

Therefore, the properties improved by the high viscosity at the low frequency, whereas, the flowability is improved by the low viscosity at the high frequency.

Example 2 demonstrates that improved impact strength and flowability remain unchanged, even when the amount of the ultra-high molecular weight branched acrylic copolymer resin and the acrylic resin is changed.

Example 3 demonstrates that if the amount of the flexible segment of the ultra-high molecular weight branched acrylic copolymer resin decreases, the improvement of impact strength is deteriorated, whereas the transparency is improved.

Examples 3 and 4 demonstrate that if the amount of the branch-inducing monomer increases, the improvement of flowability is deteriorated resulting from the increased cross-linkage and molecular weight, whereas the impact strength is improved resulting from the increased molecular weight.

Impact strength can be improved using an ultra-high molecular weight branched acrylic copolymer resin, whether

TABLE 1

| | | Examples | | | | | | | | Comparative Examples | | | | |
|---|---|---|---|---|---|---|---|---|---|---|---|---|---|---|
| | | 1 | 2 | 3 | 4 | 5 | 6 | 7 | 8 | 1 | 2 | 3 | 4 | 5 |
| A | A-1 | 50 | 30 | — | — | — | — | — | — | — | — | — | — | — |
| | A-2 | — | — | 50 | — | — | — | — | — | — | — | — | — | — |
| | A-3 | — | — | — | 50 | — | — | — | — | — | — | — | — | — |
| | A-4 | — | — | — | — | 50 | — | — | — | — | — | — | — | — |
| | A-5 | — | — | — | — | — | 50 | — | — | — | — | — | — | — |
| | A-6 | — | — | — | — | — | — | 50 | — | — | — | — | — | — |
| | A-7 | — | — | — | — | — | — | — | 50 | — | — | — | — | — |
| | A-8 | — | — | — | — | — | — | — | — | — | — | 50 | — | — |
| | A-9 | — | — | — | — | — | — | — | — | — | — | — | 50 | 50 |
| B | B-1 | 50 | 70 | 50 | 50 | 50 | 50 | 50 | 50 | 100 | — | 50 | 50 | — |
| | B-2 | — | — | — | — | — | — | — | — | — | 100 | — | — | — |
| C | | 15 | 15 | 15 | 15 | 15 | 15 | 15 | 15 | 15 | 15 | 15 | 15 | 15 |
| Haze | | 1.4 | 1.3 | 1.3 | 1.5 | 1.8 | 1.5 | 1.3 | 1.6 | 1.4 | 1.6 | 1.7 | 1.5 | 1.6 |
| TT | | 90.8 | 90.9 | 91.2 | 90.8 | 89.8 | 90.5 | 91.0 | 90.1 | 90.9 | 90.5 | 90.3 | 90.7 | 90.7 |
| Izod (Notched) | | 3.3 | 3.2 | 3.2 | 3.3 | 3.3 | 3.3 | 3.2 | 3.1 | 3 | 3.1 | 2.9 | 2.7 | 3 |
| Izod (Unnotched) | | 44 | 42 | 40 | 45 | 47 | 42 | 41 | 39 | 34 | 37 | 30 | 28 | 31 |
| falling impact strength (J) | | 2.70 | 2.45 | 2.45 | 2.70 | 2.94 | 2.45 | 2.45 | 2.33 | 2.21 | 2.21 | 2.21 | 2.08 | 2.21 |
| Melt Index (MI) | | 10.1 | 9.7 | 9.4 | 9.5 | 8.8 | 10.9 | 9.1 | 11.0 | 8.9 | 4.2 | 9.1 | 13.8 | 8.1 |
| BSP | Width (μm) | 212 | 211 | 210 | 213 | 215 | 213 | 210 | 215 | 210 | 221 | 213 | 220 | 218 |

As shown in Table 1, the acrylic resin of the Comparative example 1 exhibited good transparency and scratch resistance, but poor impact strength. Comparative Example 2 included a higher molecular weight acrylic resin to improve the impact strength, however, moldability deteriorated due to deteriorated flowability.

When the ultra-high molecular weight branched acrylic copolymer resin of the present invention (Examples 1 to 8) is used, the refractive index difference is not as large as compared with a general acrylic resin. Accordingly, transparency and scratch resistance are not deteriorated. Further, impact strength is improved by the flexible segment of the copolymer and increased molecular weight, and flowability is increased by the branched structure, which can improve moldability.

The improved flowability can be confirmed by measuring complex viscosity of the composition using ARES. As shown in FIG. 1, the complex viscosity measured by ARES shows a the kind of branch-inducing monomers (Example 6) and the kind of (meth)acrylic monomers (Examples 7 and 8) are changed or not.

Further, the amount of the branch-inducing monomers can vary so that the branched structure and molecular weight of the copolymer can be changed depending on chain length, the number of polymerizable unsaturated groups, and/or reactivity.

Comparative Example 3 demonstrates that using an ultra-high molecular weight branched acrylic copolymer resin without a flexible segment does not significantly improve impact strength.

Comparative Examples 4 and 5 demonstrate that using a linear copolymer having a flexible segment can improve flowability, but the other properties including impact strength are deteriorated.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A transparent thermoplastic resin composition comprising:
   (A) about 1 to about 100 parts by weight of an ultra-high molecular weight branched acrylic copolymer resin, wherein said ultra-high molecular branched acrylic copolymer resin (A) is prepared by polymerizing a monomer mixture comprising (a1) about 50 to about 99.899% by weight of a mono-functional monomer, wherein said mono-functional acrylic monomer (a1) comprises methyl methacrylate, ethyl methacrylate, propyl methacrylate, methyl acrylate, ethyl acrylate, propyl acrylate, 2-ethyl hexyl acrylate, 2-hydroxyethyl acrylate, 2-hydroxypropyl acrylate, monoglycerol acrylate, maleic anhydride, or a combination thereof, (a2) about 0.1 to about 40% by weight of a (meth)acrylic monomer having a flexible segment represented by the following Chemical Formula 1, and (a3) about 0.001 to about 10% by weight of a branch-inducing monomer;

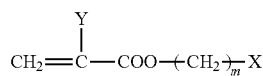

[Chemical Formula 1]

wherein:
   m is an integer from 3 to 18, Y is methyl or hydrogen, and X is methyl or hydrocarbon; and
   (B) about 0 to about 99 parts by weight of an acrylic resin.

2. The transparent thermoplastic resin composition of claim 1, wherein said ultra-high molecular branched acrylic copolymer resin (A) comprises (a1) about 50 to about 99.899% by weight of a said mono-functional monomer, (a2) about 0.1 to about 40% by weight of said (meth)acrylic monomer, and (a3) about 0.001 to about 10% by weight of said branch-inducing monomer.

3. The transparent thermoplastic resin composition of claim 1, wherein said transparent thermoplastic resin composition further comprise (C) about 0 to about 40 parts by weight of an acrylic impact modifier, based on 100 parts by weight of (A) and (B).

4. The transparent thermoplastic resin composition of claim 1, wherein said ultra-high molecular branched acrylic copolymer resin (A) has an weight average molecular weight of about 100,000 to about 5,000,000.

5. The transparent thermoplastic resin composition of claim 1, wherein said ultra-high molecular branched acrylic copolymer resin (A) has a refractive index of about 1.480 to about 1.495.

6. The transparent thermoplastic resin composition of claim 1, wherein said (meth)acrylic monomer (a2) comprises a compound of Chemical Formula 1 wherein m is an integer from 3 to 9, a compound of Chemical Formula 1 wherein m is an integer from 10 to 18, or a combination thereof.

7. The transparent thermoplastic resin composition of claim 1, wherein said (meth)acrylic monomer (a2) comprises butyl (meth)acrylate, t-butyl (meth)acrylate, hexyl (meth)acrylate, 2-ethyl hexyl (meth)acrylate, stearyl (meth)acrylate, lauryl (meth) acrylate, or a combination thereof.

8. The transparent thermoplastic resin composition of claim 1, wherein said branch-inducing monomer (a3) comprises a silane or siloxane compound including an unsaturated hydrocarbon group-containing silicone-containing monomer; an allyl compound; a (meth)acrylic monomer; an aromatic monomer; a vinyl group-containing monomer; or a combination thereof.

9. The transparent thermoplastic resin composition of claim 8, wherein said silane or siloxane compound including an unsaturated hydrocarbon group-containing silicone-containing monomer comprises divinyl tetramethyl disiloxane, tetramethyl tetravinyl cyclotetrasiloxane or a combination thereof; said allyl compound comprises diallyl phthalate, diallylacrylamide, triallyl (iso)cyanurate, triallyl trimelitate, or a combination thereof; said (meth)acrylic monomer comprises 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate, glycerol tri(meth)acrylate, or a combination thereof; said aromatic monomer comprises divinyl benzene; and said vinyl group-containing monomer comprises 1,4-divinyloxybutane, divinyl sulfone, or a combination thereof.

10. The transparent thermoplastic resin composition of claim 1, wherein said acrylic resin (B) has an weight average molecular weight of about 5,000 to about 300,000.

11. The transparent thermoplastic resin composition of claim 1, wherein said acrylic resin (B) has a linear structure and comprises a copolymer of one or more kinds of (meth)acrylic monomers, a polymer of one kind of (meth)acrylic monomer, or a combination thereof.

12. The transparent thermoplastic resin composition of claim 11, wherein said (meth)acrylic monomer comprises methyl methacrylate, ethyl methacrylate, n-propyl methacylate, n-butyl methacylate, phenyl methacrylate, benzyl methacrylate, hexyl methacrylate, cyclohexyl methacrylate, phenoxy methacrylate, phenoxyethyl methacrylate, methyl acrylate, ethyl acrylate, propyl acrylate, butyl acrylate, 2-ethyl-hexyl acrylate, 2-ethyl-hexyl-methacrylate, or a combination thereof.

13. The transparent thermoplastic resin composition of claim 3, wherein said acrylic impact modifier (C) is prepared by graft polymerization of one or more rubber monomers comprising acrylic rubber monomer; and one or more monomers comprising methyl methacrylate, styrene, α-methyl styrene, C1-C4 alkyl-substituted styrene, acrylonitrile, methacrylonitrile, maleic acid anhydride, C1-C4 alkyl N-substituted maleimide, phenyl N-substituted maleimide, or a combination thereof.

14. The transparent thermoplastic resin composition of claim 1, wherein a specimen prepared therefrom having dimensions of L 90 mm×W 50 mm×T 2.5 mm has a Haze of less than about 10 as measured by a Haze meter NDH 2000 manufactured by Nippon Denshoku.

15. The transparent thermoplastic resin composition of claim 1, further comprising an additive selected from the group of antimicrobials, release agents, thermal stabilizers, antioxidants, light stabilizers, compatibilizers, pigments, inorganic fillers, surfactants, nucleating agents, coupling agents, fillers, plasticizers, impact modifiers, coloring agents, stabilizers, lubricants, antistatic agents, dyes, flameproof agents, and combination thereof.

16. A molded article prepared from the transparent thermoplastic resin composition of claim 1.

17. The transparent thermoplastic resin composition of claim 1, comprising (B) about 1 to about 99 parts by weight of said acrylic resin (B).

18. The transparent thermoplastic resin composition of claim 17, comprising (B) about 50 to about 99 parts by weight of said acrylic resin (B).

* * * * *